Aug. 20, 1968 W. H. BURKHART, JR 3,397,599
TOOL MANUFACTURE

Original Filed June 11, 1963 2 Sheets-Sheet 1

INVENTOR.
WILLIAM H. BURKHART Jr.
BY
Harry G. Shapiro
ATTORNEY

Aug. 20, 1968  W. H. BURKHART, JR  3,397,599
TOOL MANUFACTURE

Original Filed June 11, 1963  2 Sheets-Sheet 2

INVENTOR.
WILLIAM H. BURKHART JR.
BY
Harry G. Shapiro
ATTORNEY

United States Patent Office 3,397,599
Patented Aug. 20, 1968

3,397,599
TOOL MANUFACTURE
William H. Burkhart, Jr., 29 Dryden Terrace,
Short Hills, N.J. 07078
Original application June 11, 1963, Ser. No. 287,150.
Divided and this application Apr. 1, 1966, Ser. No. 539,414
7 Claims. (Cl. 76—107)

ABSTRACT OF THE DISCLOSURE

A tool and method of making a tool which employs a plurality of shearing elements. The shearing elements are mounted in adjacent parallel relationship on a flexible strip. The elements each have a substantially flat face adjacent the strip and terminate in a shearing edge so that the shearing edges of the plurality of elements furnish a total shearing edge extending lengthwise of the flexible strip. A strip with the shearing elements mounted thereon is positioned on a work surface and the strip is bent to the curvature desired for the shearing edge of the tool. Then, a matrix is provided to maintain the elements in their desired curvature, following which the mounting strip is removed.

---

The invention relates to improvements in cutting or blanking tools or the like, more particularly of the punch and die type, and to improvements in methods and means for manufacturing such tools.

This application is a division of pending application Ser. No. 287,150; filed June 11, 1963.

It has long been desirable to make blanking punches and dies which are inexpensive and which will produce satisfactory work coupled with long tool life. Mating punches and dies which have substantial life expectancy are expensive because of the many hours of skilled labor and the expensive capital equipment required to fabricate them. Low cost methods, such as the steel rule die method and others have been proposed; however, punches and dies made by such methods cannot be held to close clearances, particularly required in the punching of thin stock, and as a result, wear out in a comparatively short time.

Primary objects of the invention are to provide novel means and methods for making tools, particularly of the punch and die type, which eliminate the need for expensive precision machine tools, measuring instruments and other expensive capital equipment, and the many long man-hours of a skilled toolmaker's time which are normally required to make a blanking tool capable of producing accurately dimensioned workpieces in substantial runs. Correlatively, the purposes of the invention are to provide simple means which will enable the fabrication of shearing or blanking tools and the like capable of producing satisfactory work by a simple, inexpensive procedure. In accordance with the invention, tools having accurately determined close clearances may be made on the premises of shops which have little or no capital investment in expensive machine tools and measuring instruments, and with comparatively unskilled labor. Also, the usual hardening which follows the fabrication of the tools may be eliminated.

Pursuant to the realization of the foregoing objectives, the invention provides well fitted blanking or shearing tools or the like of novel structure which are capable of producing accurately made work, including work of complex shapes, in substantial runs.

These, and other objects and advantages of the invention will be apparent from the following detailed description of a preferred embodiment of the invention, taken in conjunction with the drawings, in which.

The invention may be explained in terms of the forces which occur or are created when a tool acts to shear a workpiece. When shearing, and if the clearance between the cooperating shearing members is minimal, the forces created and borne by the shearing members are primarily in the direction of shearing; in a direction perpendicular to the direction of shearing, the resultant forces are relatively small or weak. For example, one may readily shear tough material with scissors when the blades thereof are properly and closely adjusted. However, if the adjusting screw is loose, the material being sheared causes the blades to separate and there are substantial forces in a direction perpendicular to the direction of shearing. Similarly, in a punch and die made to close tolerances at the cooperating shearing edges or working faces, practically all of the forces are directed downwardly or in the direction of punching. The forces borne or absorbed by the punch and die in a direction perpendicular to the direction of shearing are quite small. Since the main forces to be borne by the punch and die are at the shear surfaces along their vertical axes, the support for such shearing may possess a measure of resistance to distortion which is considerably lower than required at the shearing surfaces.

The invention takes advantage of the foregoing observations by constructing punches and dies or various tools in general of relatively small, thin shearing elements or modules which furnish strong working surfaces at the areas where strength is required, using the modular character of such elements to enable their manipulation into conformity with the desired contour of a complete shearing or working surface of which such elements individually constitute but a part, and supporting the plurality of elements by means of a matrix which, though weak in comparison to the strength of the shearing elements, adequately absorbs the relatively weak forces imposed upon such form of support.

A blanking tool in accordance with the invention comprises a plurality of preformed metal elements or modules arranged to provide the actual working portion of the tool wherein the preformed working elements are supported in predetermined position by a matrix formed of a cast resin or a low melting point alloy.

As will be subsequently explained, though the invention is particularly applicable for the manufacture of punches and dies, and may be best explained with relation to tools of this kind, the invention is not limited to tools of this character.

Figure 1:
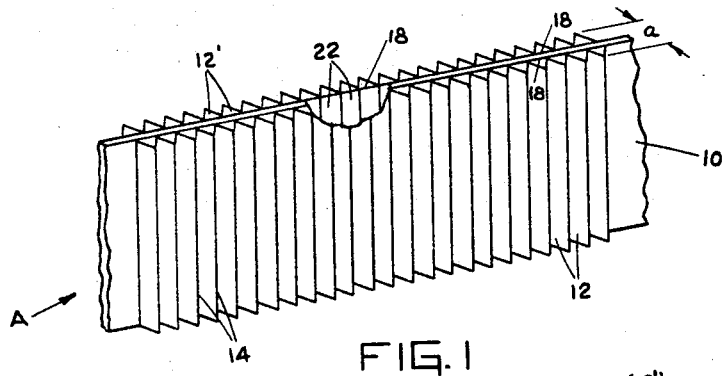
FIG. 1 is a perspective view, partly broken away, of an article of manufacture comprising shearing elements mounted on a strip, which article is used in the fabrication of a punch and die in accordance with the invention.

Referring to the drawings, FIG. 1 illustrates an article, designated A, which is particularly adapted for making a punch and die in accordance with the invention. The article A comprises a continuous or substantially endless strip 10 having mounted thereon a plurality of shearing elements, modules or prisms arranged in parallel relationship. As shown, and in accordance with the preferred form of the invention, the shearing elements are mounted on both sides of the strip, the elements on one side of the strip being designated 12 and on the other side 12'.

The strip or ribbon 10 is made of a flexible material and serves as a spacer between the respective series of elements 12 and 12' on the opposite sides of the strip. As will subsequently be explained, the distance or spacing between the elements on respective sides of the strip represents the amount of clearance which will be provided between the finished punch and die. In addition to its properties of thinness, flexibility and strength, the material used for the strip 10 is selected for its resistance to heat, and resistance to wetting or adhesion or chemical attack by the matrix material. The spacer strip may be made of any suitable material having the indicated properties. Examples of such material are films of a synthetic resin such as Mylar, Lexan, or Merlon. Mylar is a long chain synthetic polymer composed of at least 85% by weight of an ester of a dihydric alcohol and terephthalic acid, as made by the Du Pont Company. Lexan and Merlon are polycarbonates or polymers of bisphenol made by the General Electric Company and Mobay, respectively. These materials are commercially available in film form of a thinness as small as 0.0005".

The shearing elements may be mounted on the strip by means of a thin adhesive coating, it being desired that the strip and its coating be kept as thin as desired because the distance between the elements on respective sides of the strip will constitute the clearance or spacing between the finished punch and die.

The elements 12 and 12' are preferably of the same contour and may be substantially identical in length as shown. They are formed or shaped to allow the strip upon which they are mounted to be bent to conform the assembly A to a desired curvature. For a punch and die, the elements are made of hardened steel, tungsten carbides or other suitable tool material, and as shown, preferably have an equilateral triangular cross-section. A triangular contour in transverse cross-section is preferred because such shape permits maximum flexure or curvature of the assembly A. Other element contours may be used, particularly where the shearing or working face of the finished tool which is to be made from the assembly is straight or possesses substantial radii. Although the size of the individual shearing elements is not critical, it will be apparent that with elements of smaller size, the assembly may be conformed to curvatures having smaller radii. In any event, the elements are small in relation to the radius of curvature which they will describe, and they are dimensionally but a small fraction of the overall dimensions of the blank which they will punch. As an example, and with regard to the illustrated elements of equilateral triangular cross-section, a convenient size for the elements is one-half (½) inch in length and 0.050 inch along each transverse side. Although the corner 14 of each element may be provided with a radius, the corners 16 at each end of the edge 18 should be sharply defined.

Figure 2:
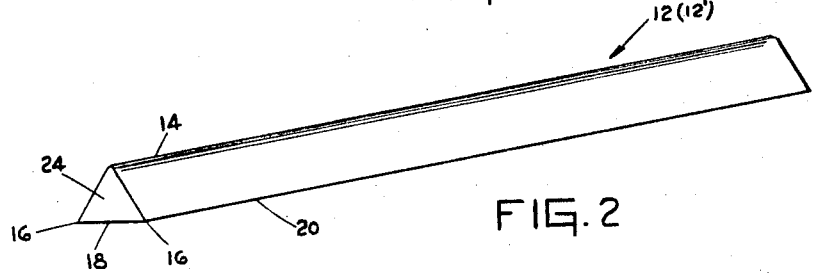
FIG. 2 is an enlarged perspective view of one of the shearing elements which is mounted on the strip shown in FIG. 1.

The shearing elements are mounted on the strip with their longitudinal edges 20 in contiguity. The elements' flat faces 22 are adjacent the strip and terminate in the edges 18 which extend parallel to the length of the strip. The edge 18 of each element defines one side of the end face 24. With symmetrical elements as shown in FIGS. 1 and 2, the face and edge at the opposite end corresponding to the face 24 and edge 18 are the same in shape and dimensions. The edges 18 are contiguous and extend substantially in the same plane. The linear alignment and contiguity of the edges 18 will provide a continuous shearing edge substantially equal to the sum of the lengths of such individual edges to the extent that a predetermined length of the assembly A is used. The faces 22 of each series of elements will provide a continuous working surface of a tool member when the elements are rigidly supported with respect to one another. The relatively short width of each of the contiguously related elements across their faces 22, coupled with the hinges which, in effect, are supplied by the strip at the areas of the elements' adjacency or contiguity permits relatively sharp curvature or flexure of the assembly A. Thus, the faces 22 in a length of the assembly may be conformed very closely to a desired curvature within or as part of a predetermined outline of a pair of complementary blanking tools.

Figure 3:
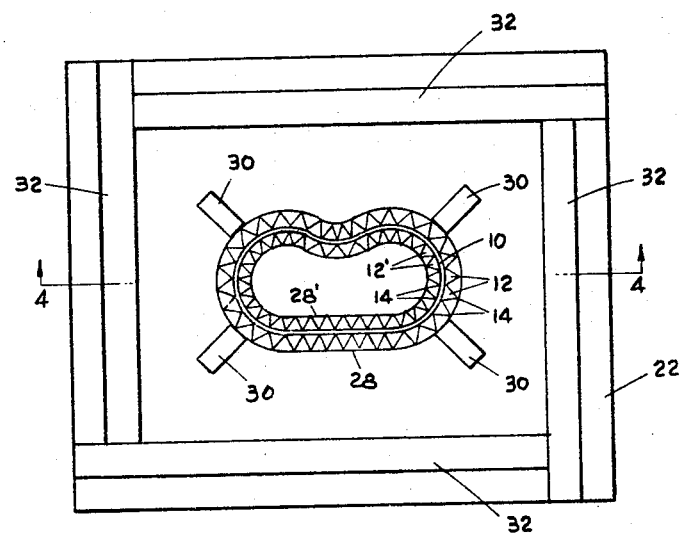
FIG. 3 is a top plan view showing the manner in which the article of FIG. 1 may be arranged in the manufacture of a mating punch and die.
Figure 4:
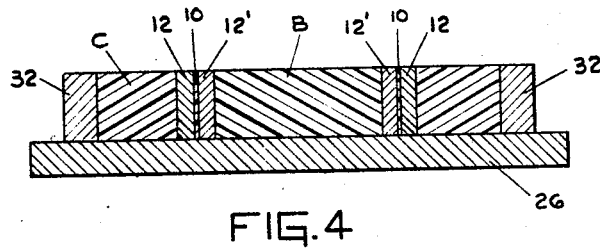
FIG. 4 is a vertical cross-sectional view taken approximately in the plane of line 4—4 of FIG. 3, this view additionally showing the matrices which support the shearing elements of the punch and die.

FIGS. 3 and 4 illustrate how a punch and die may be made by means of a length cut from a continuous length of the assembly A shown in FIG. 1. A flat work surface or plate 26, preferably of magnetic material, is engraved with an outline corresponding to the desired contour for the punch and die to be fabricated. This may be accomplished by engraving on the plate 26 a pair of parallel lines 28 and 28' (FIG. 3) spaced from one another by an amount equal to the overall thickness $a$ (FIG. 1) of the shearing elements mounted on the strip. The dimension $a$ is predetermined and precise because the elements 12 and 12' are of precise and known dimensions and the thinness of the strip 10 and its coating are known. The parting line of the punch and die will be midway between the lines 28 and 28'. If desired, either the line 28 or the line 28' may be inscribed on the plate, instead of both lines. The inscribed line or lines may be laid down by following a pattern made from a scale drawing of the punch or die or, a pantograph stylus which follows a scale drawing of the workpiece to be blanked by the finished punch and die may be used for laying down the outline to be followed, one-half of the dimension $a$ being added and subtracted for the lines 28 and 28', respectively. It will be apparent that various other procedures may be used for imparting the desired contour to a length cut from the continuous length assembly A to conform the length of strip with the shearing elements mounted thereon to the desired contour for the punch and die to be fabricated. When utilizing the procedure involving inscribing a line or lines on the support plate 26, the plate is then coated with a suitable transparent releasing agent, compositions of which are well known in the art of plastic molding, for example, polyvinyl acetate or silicone.

As will be apparent from FIGS. 3 and 4, the strip 10 with the shearing elements 12 and 12' mounted thereon is placed on the inscribed plate 26 with the elements on their ends; that is, with either the end faces 24 or the corresponding faces on the opposite ends of the elements in engagement with the plate. The elements' free edges or corners 14 are positioned on the inscribed lines 28 and 28', and to aid in precisely accomplishing such positioning and to assure that the elements are perpendicular to the work surface, a plurality of small magnets 30 may be used. The continuous assembly A is severed by cutting the strip between elements when the desired outline is completed and the cut ends are butt jointed to provide a closed assembly as shown in FIG. 3. The small magnets 30 are inexpensive, and after having served to locate the elements on the desired contour, may be left in place. It will be understood that the particular contour shown in FIG. 3 is for illustrative purposes only, and that the contour can be made to suit the particular configuration desired for the punch and die.

As shown in FIG. 3, a dam may be made by using four bar magnets 32. The bar magnets preferably are coated with a release agent and will cling to each other and to the plate 26. In this manner, the dam surrounding the contoured assembly of shearing elements 12, 12′ on the spacer strip 10 is held in place so that a matrix may be provided to support the shearing elements in their predetermined position.

A suitable material for the matrix is a synthetic thermosetting resin such as an epoxy resin which may contain glass or metal fiber reenforcing materials. Other resins may be used, for example, a phenol formaldehyde. Also, it is within the scope of the invention to use a low melting point alloy. The hardenable resin or alloy is poured into the outer cavity bounded by the shearing elements 12 on the inner side of the cavity and in the second cavity which is bounded by the shearing elements 12′. Since the assembly A is symmetrical in the sense that the shearing elements are of the same contour and dimensions, there is no need to orient the assembly for the purpose of making the punch and die from a series of elements on a particular side of the strip. The elements on either side will furnish the working face of either the punch or die.

After the resin or metal alloy has cured or hardened, the bar magnets 32 and the plate 26 are removed, thereby leaving an assembly of contoured shearing elements with an intermediate strip 10, an inner matrix B and an outer matrix C. The punch consisting of the shearing elements 12′ and the matrix B is nested in the die consisting of the elements 12′ and the matrix C. The punch and die however, are still connected to one another by the intermediate strip 10. The punch and die assembly of FIG. 4, now without the support plate 26 and the dam members 32, is then placed in a grinding machine and ground true and flat on the top and bottom sides to assure that the shearing elements on the punch and die will butt directly against the hardened supports upon which they will be mounted, the opposite ends of the elements providing the continuous cooperating shearing edges of the punch and die. After the grinding operation, the punch unit is forced out of the die unit in any suitable manner, as by means of an arbor press.

It will be apparent that the described method of manufacture results in the shearing elements 12′ on the punch being precisely and closely spaced from the shearing elements 12 of the die by an amount equal to the thinness of the strip 10 and the coating which has adhered the shearing elements to the strip. Such spacing or clearance may be kept exceedingly small, on the order of 0.001″ or better if desired. The completed working faces and shearing edges of both the punch and die are provided by the continuously and contiguously arranged modules of shearing elements supported by their respective matrices.

Figure 5:
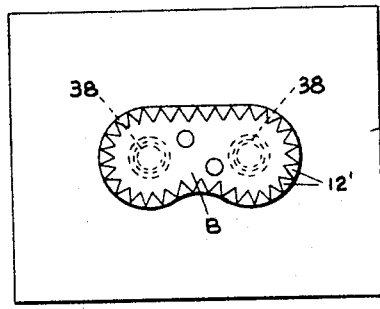
FIG. 5 shows the working faces of a punch and die made in accordance with the invention, the punch and die being mounted on support plates to provide a punch and die set.
Figure 6:
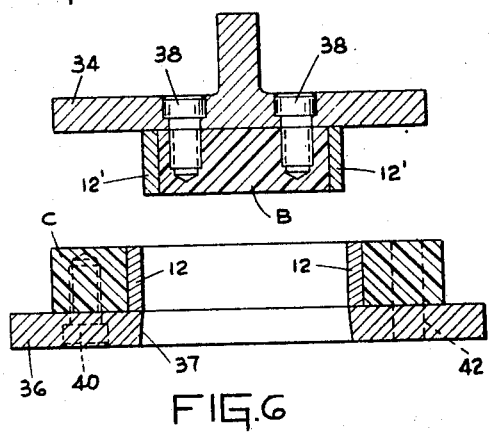
FIG. 6 is a vertical cross-sectional view showing the operating relationship of the punch and die set of FIG. 5.

FIGS. 5 and 6 show the resultant punch and die mounted on hardened and ground support plates, the punch being connected to the support plate 34 and the die to the support plate 36 having the usual aperture 37. For this purpose, the punch may be bolted to the plate 34 as by the bolts 38 extended into the matrix B and the die connected to the support plate 36 as by means of the bolts 40. Also, the usual dowel pins 42 may be provided for aligning the punch and die support plates as is well known in the art. In order to minimize the procurement problem of small shops which would manufacture punches and dies in accordance with the invention, different and modular sizes of dowelled support plates may be furnished, together with continuous lengths of the assemblies A and containers of resin or metal alloy, and fiberglass or other reinforcing materials. Where the customer desires to use an epoxy resin for the matrices, the resin and the hardener or curing agent for the resin may be supplied in separate containers. The hardened support plates may be supplied already drilled, tapped, reamed and dowelled so that the one who makes punches and dies in accordance with the invention need not perform these operations.

It is of course recognized that any punch and die set requires means for stripping the punch stock off the punch and means for extracting the blank from the die. These operations and the means for accomplishing same are well known in the art and do not constitute a part of the present invention.

Figure 7:
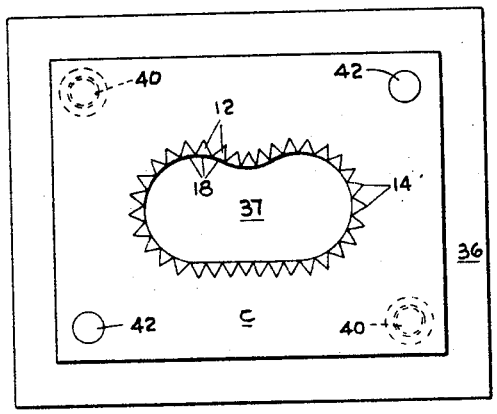
FIG. 7 is a perspective view of another form of article suitable for making a tool in accordance with the invention.
Figure 7:
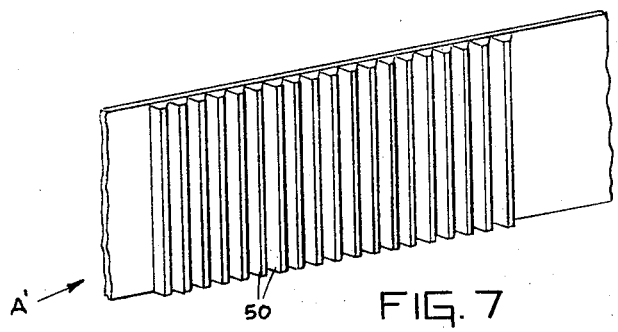

It will be apparent that although the invention is particularly applicable for the manufacture of punches and dies, it is not restricted to such manufacture. It may be desired to make a punch alone in accordance with the invention, the die being made of rubber or manufactured in some other manner. In such case, the shearing elements or modules may be mounted on but one side of a carrier strip as shown in FIG. 7, thereby taking advantage of the modular form of working elements and the ability to simply fabricate the working elements into a finished tool. While tools made in accordance with the invention are particularly suitable for operation upon the various metals, it will be apparent that they may be used for wood-working and operation on other materials.

Figure 8:
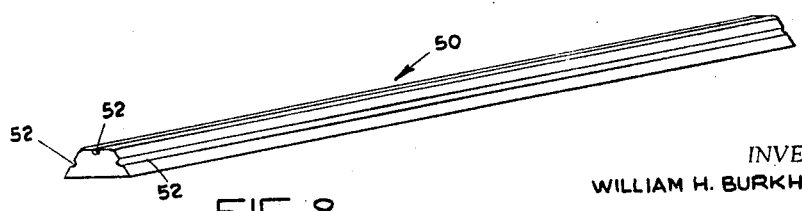
FIG. 8 is a perspective view, greatly enlarged, of a modified form of shearing element suitable for use with the article of FIG. 1 or of FIG. 7.

The assembly of FIG. 7, designated A′, also shows another preferred shape for the individual modules or working elements, here designated 50, and shown on an enlarged scale in FIG. 8. Each of the elements is substantially trapezoidal in transverse cross-section and is provided with longitudinally extending grooves 52 on the faces which will be in engagement with the matrix in the finished tool. Such grooves provide means for keying and improved connection of the elements to the matrix. It will be apparent that such keying means may be used with the elements illustrated in FIGS. 1 and 2. Also, the working elements may be etched at the faces which will engage the matrix to increase the measure of adherence of the matrix to the elements.

While the invention has been specifically described with regard to the manufacture of shearing or blanking tools involving the use of elements or modules of steel or tungsten carbide, the invention is also useful in the manufacture of shaped electrodes such as are used in electrical discharge machines, a technique such as described in the Oct. 16, 1961 issue of American Machinist/Metalworking Manufacturing at pp. 97–99. In making electrodes for use with electrical discharge machines (EDM), the working elements or modules which are mounted on the carrier strip may be of brass or other conductive material suitable for EDM work. For the desired electrical conductivity, the matrix may be made of an epoxy resin compounded with an electrically conductive filler such as copper or silver flake or, the matrix may be made of a low melting point, electrically conductive alloy. An electrode "die" made in accordance with the modular concept of the invention may be used for the EDM cutting of a hard punch, while an electrode "punch" made in accordance with the invention may be used for the cutting of a hard die. The carbide or other hard metal should be cut roughly to the proper size using any rough electrode. Then electrodes made in accordance with the invention may be used to make the final cut to the desired and exact dimensions.

It is believed that the advantages and improved results furnished by the invention will be apparent from the foregoing detailed description of a preferred embodiment of the invention. It will be understood that various modifications and changes may be made without departing from the spirit and scope of the invention as sought to be defined in the following claims.

I claim:
1. A method of making a tool comprising providing a strip of flexible material having a plurality of separate metal elements mounted on said strip in adjacent parallel relationship, the flexibility of the strip providing hinges for the elements at their areas of adjacency, wherein each of the elements has a substantially flat face adjacent the strip terminating in a shearing edge extending parallel to the length of the strip, with the elements' said shearing edges contiguous and extending in substantially the same plane, and with the elements formed to allow the strip to be bent to conform said edges to a predetermined curvature, positioning the strip having the elements mounted thereon as aforesaid on a work surface with said faces conforming to the predetermined outline of the tool, providing a matrix to support said elements in predetermined position, and removing said strip.

2. A method as set forth in claim 1, wherein the matrix is formed by casting a hardenable resin.

3. A method as set forth in claim 1, wherein the matrix is formed of a low melting point metal alloy.

4. A method of making a pair of mating tool members comprising providing a spacer strip of flexible material having a series of separate metal elements mounted on each side of said strip in adjacent parallel relationship, the flexibility of the strip providing hinges for the elements at their areas of adjacency, wherein each of the elements has a substantially flat face adjacent the strip terminating in a shearing edge extending parallel to the length of the strip, with the elements' said shearing edges on respective sides of the strip contiguous and extending in substantially the same plane, and with the elements formed to allow the strip to be bent to conform said edges to a predetermined curvature, positioning the strip having the elements mounted thereon as aforesaid with said faces conforming to the predetermined outline of the tool members at their parting line, providing a matrix to support each series of elements in predetermined position, and removing the intermediate strip.

5. A method of making a mating punch and die comprising providing a spacer strip of flexible material having a series of separate metal elements mounted on each side of said strip in adjacent parallel relationship, the flexibility of the strip providing hinges for the elements at their areas of adjacency, wherein each of the elements has a substantially flat face adjacent the strip terminating in a shearing edge extending parallel to the length of the strip, with the elements' said shearing edges on respective sides of the strip contiguous and extending in substantially the same plane, and with the elements formed to allow the strip to be bent to conform said edges to a predetermined curvature, positioning the strip having the elements mounted thereon as aforesaid with said faces conforming to the predetermined outline of the punch and die at their parting line, providing a matrix to support the series of elements on one side of the strip and a second matrix to support the series of elements on the other side of the strip, grinding the opposite faces of the assembled elements and matrices and removing the intermediate strip, the thinness of the strip providing the clearance between the punch and die.

6. A method as set forth in claim 5, wherein the matrix is formed by casting a hardenable resin.

7. A method as set forth in claim 5, wherein the matrix is formed of a low melting point metal alloy.

References Cited

UNITED STATES PATENTS

| | | | |
|---|---|---|---|
| 3,166,968 | 1/1965 | Krouskop | 76—107 XR |
| 3,315,346 | 4/1967 | Duffield | 76—107 XR |

WILLIAM W. DYER, JR., *Primary Examiner.*

R. L. FARRIS, *Assistant Examiner.*